May 22, 1962  R. C. FORNEY ET AL  3,036,214
VISCOSITY DETERMINATION
Filed Nov. 29, 1955
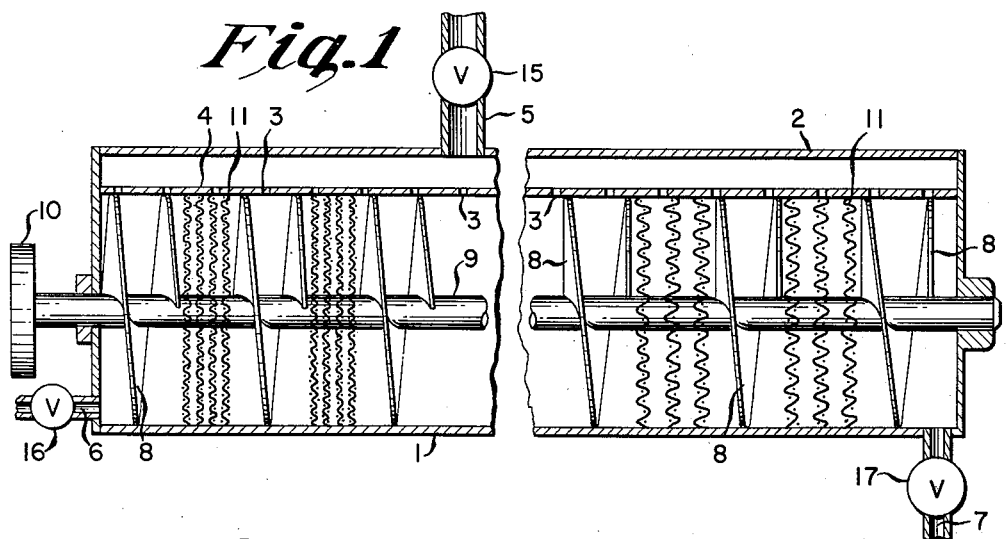
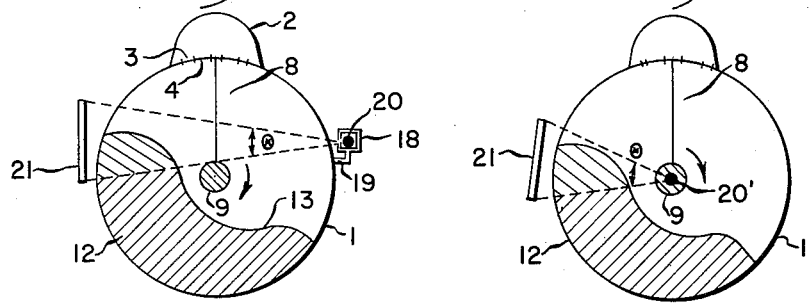
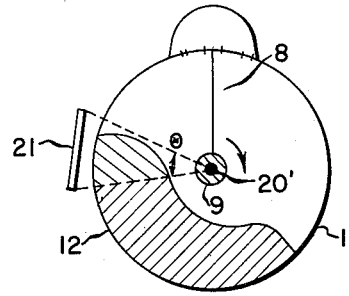
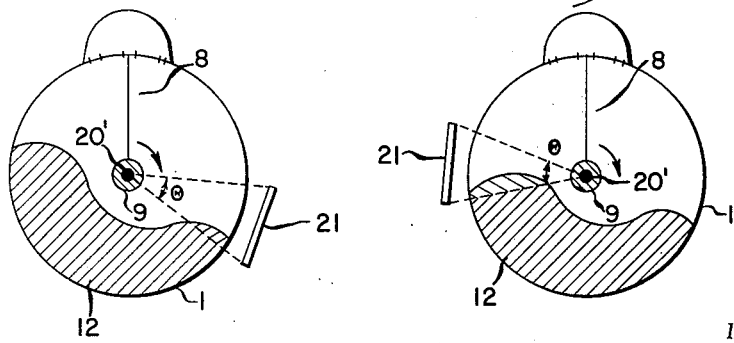
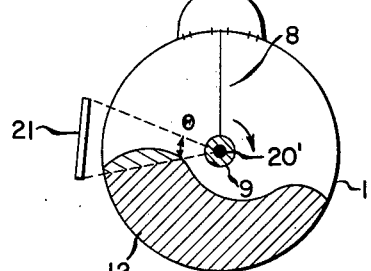
INVENTORS
ROBERT C. FORNEY
ALFRED B. HURT, JR.
BY Charles A. McClure
ATTORNEY

United States Patent Office 3,036,214
Patented May 22, 1962

3,036,214
VISCOSITY DETERMINATION
Robert C. Forney, Grifton, and Alfred B. Hurt, Jr., Kinston, N.C., assignors to E. I. du Pont de Nemours & Company, Wilmington, Del., a corporation of Delaware
Filed Nov. 29, 1955, Ser. No. 549,687
8 Claims. (Cl. 250—43.5)

This invention relates to determination of viscosity, particularly in polymeric systems.

In preparation of polymers of high molecular weight, such as fiber-forming polyamides and polyesters, a continuous polymerization procedure favors uniform physical properties in the product provided attainment of a reasonably constant terminal viscosity, which is an index of degree of polymerization. Sampling of the polymerized material is an insufficient measure because usually considerable time, perhaps several hours, elapses from introduction of the usual low-molecular-weight starting material, often a mixture of dimer, trimer, and the like, until withdrawal of polymer prepared from it. In a usual type of polymerizing vessel having rotating advancing and agitating blades, paddles, etc., monitoring of the drive required for constant rotation of the supporting shaft is also unsatisfactory because of the overwhelming build-up in viscosity near the end of the process and because of complication from varying drag in the shaft seals. Similar difficulties are encountered in other reaction systems and, to some extent, even in measurement of high viscosities in any completely enclosed medium.

A primary object of the present invention is improved determination of viscosity. An object is control of viscosity in a reaction mixture. Other objects of the present invention, together with means and methods for attaining the various objects, will be apparent from the following description and the accompanying diagrams.

FIGURE 1 is a schematized longitudinal central sectional elevation of a vessel suited to use according to the present invention. FIGURE 2 represents a transverse section through the apparatus of FIGURE 1, with indication of additional elements employed in the measurement of high viscosity according to this invention. FIGURE 3 shows a modification of the apparatus of FIGURE 2 making the same measurement. FIGURE 4 shows like measurement but with one of the elements of FIGURE 3 in different position. FIGURE 5 shows the same apparatus measuring a lower viscosity than that indicated in the previous figures.

In general, the objects of the present invention are accomplished by agitating a partially confined liquid about an axis oriented non-vertically to produce relative vertical displacement of portions of the surface of the liquid at locations on opposite sides of the axis, beaming radiant energy through at least part of a displaced surface portion of the liquid, and measuring the energy transmitted after at least partial interception of the beam by the liquid. The invention extends to a process of continuously passing polymerizable material at a constant rate through such a vessel having a substantially horizontal axis, agitating the material in predominantly one direction about the axis and otherwise exposing the material to conditions conducive to polymerization inside the vessel, whereby the viscosity of the material increases during its passage through the vessel, monitoring the viscosity of the material in the vessel at a location between the inlet and outlet ends by determining the mass of material there displaced about the axis, and counteracting any indicated deviation in viscosity from a constant value by imposing a contrary change in the polymerization conditions. In apparatus for accomplishing such a process, this invention comprehends a cylindrical vessel with intake and outlet at opposite ends and means mounted axially for rotation relative thereto and adapted to displace the contents both along and about the axis, and a source and a detector of gamma radiation located along a fixed line transverse to the axis and intercepting part of the displaced contents.

As is apparent, the present invention utilizes the limited displacement of the contents of the vessel from the level position normally assumed under gravity alone; of course, the vessel should not be filled to capacity (preferably not more than about ¾ full), and the agitation should not be so excessive as to distribute the contents uniformly throughout the vessel. The term "liquid" as applied here to the contents of the vessel includes dispersions, slurries, and other liquid/solid mixtures behaving in essentially the same way under agitation. The method is applicable to pipes or like vessels through which a liquid is forced and agitated, as by a screw impeller, as well as to closed vessels in which a given charge of liquid is being stirred.

FIGURE 1 shows apparatus adapted to either batchwise or flow use according to this invention, being especially useful for continuous condensation polymerization. Cylindrical shell 1 carries dome 2 along the top in communication with the interior of the shell through apertures 3 in intervening common wall 4. The dome has connecting pipe 5 with valve 15 leading to a pressure/vacuum system (not shown); the shell has pipe 6 with valve 16 connected at one end near the bottom and outlet pipe 7 with valve 17 connecting to the bottom of the opposite end. Extending axially through the cylindrical shell and journaled at each end is rotatable shaft 9 carrying interrupted screw flights 8 and intervening transverse screens 11 for rotation inside the shell and having pulley 10 for driving connection at one end outside the shell.

FIGURE 2 shows the location of additional elements utilized in the practice of this invention relative to a schematic transverse section of the apparatus just described; the shell appears partly filled with material 12, whose surface 13 is distorted from level by rotation of the shaft and accompanying elements. Attached by external bracket 19 to one side of the shell is housing 18 for radiation source 20, and located externally near the opposite side of the shell is radiation detector 21. The elevated portion of the surface of the unevenly distributed liquid material intercepts part of the radiation passing (in angle θ) from the source to the detector; the radiation is of such character that some reaches the detector despite the illustrated substantially complete interception of the radiation angle by the liquid.

Operation of this apparatus is readily understood. Given constant rotation of the shaft, the steady state of uneven distribution (in which the liquid is elevated at one side of the shaft and depressed at the other side) produced by the attached agitation means is influenced strongly by the viscosity of the liquid. When the liquid is quite viscous, the difference between the two extremes will be appreciable. The illustrated hump of liquid in the diagrams is merely schematic, as the actual contour will depend upon physical characteristics of the liquid and of the agitating means (among other variables). Upon interception of the radiation path by the elevated portion of the liquid surface, less radiation from the source reaches the detector; the response of the detector at various viscosities (which can be calibrated by usual sampling and viscosity-measuring techniques) is easily recorded manually or instrumentally for future reference. With high-energy radiation of submillimicron wavelength, the diminution in reception at the detector is dependent upon the mass of the intervening liquid, rather than upon its maximum height.

FIGURE 3 shows a convenient modification of the described apparatus in which the detector is located as before but the radiation source (20') lies in a hollow in the rotating shaft; an equivalent source intensity (to that utilized in the arrangement of FIGURE 2) depends upon the relative densities and thicknesses of the shell and the shaft and upon the change in distance between source and detector, but this central location usually permits use of a smaller source while minimizing the problem of radiation shielding outside the shell. Of course, the radiation detector also may be relocated; if desired, it may be moved to the depressed side of the liquid, as in FIGURE 4, so that an increase in viscosity appears as an increase in the detected signal, instead of a decrease as formerly. Furthermore, detectors may be employed at both locations shown in FIGURES 3 and 4 and may be connected in known manner to give a net response determined by the difference in radiation received by each; such a differential arrangement largely eliminates dependence on the quantity of liquid in the system, which itself may be determined by locating like detectors all around the shell rather than at just one or two locations. However, at constant content of a given liquid only one detector is necessary to measure a viscosity change, such as the decrease represented in FIGURE 5 from the higher value shown in FIGURES 2-4, inclusive.

Readily available and quite suitable as sources of the desired radiation are various radioactive elements, e.g., cobalt 60 and cesium 137. In addition to normal shielding precautions for the benefit of operating personnel, caution should be exercised to avoid hazard from such material during installation and maintenance of the equipment. Suitable detectors for the radiation may be selected from those commercially available, which include ion chambers, Geiger counters, and scintillated counters; the detector may operate conventional recording apparatus, and it is desirable to eliminate the effect of random or periodic disturbances in the liquid system, as may be produced by an asymmetrical agitation means, by recording only readings integrated over an appreciable exposure time or by utilizing a recorder with appreciable damping or other lag.

For example, the apparatus of FIGURES 1 and was used successfully in the manufacture of fiber-forming polyethylene terephthalate from a partial condensate of bis-(2-hydroxy ethyl) terephthalate having an intrinsic viscosity of 0.13 passing slowly through the reaction vessel at 275° C. (provided by jacketing with vapor) and pressure equivalent to 1-2 mm. Hg (assured by evacuation through the dome pipe, which also acted as exhaust for gaseous by-products, chiefly ethylene glycol). A 25 millicurie source of cobalt 60 was located in the hollow shaft between two screw flights somewhat more than midway through the vessel from the intake to the outlet end, and the rates of intake and outlet were adjusted by means of the indicated valves so that the levels at each end, observed through bubble tubes, remained constant. At a shaft rotation rate of one turn per minute and intrinsic viscosity of 0.63 for the output polymer, the intensity of radiation at the outer surface of the vessel (after passage through a total of about 1½ inches of steel and 4 inches of asbestos insulation) fell within the range of 3.5±0.5 milliroentgens per hour (mr./h.) and at equilibrium operation remained constant within a range of ±0.04 mr./h. Located near the outer wall of the vessel, about 4 feet from the source, an instrument comprising an ion chamber (Ohmart Corp., Model LI Cell) feeding a recording potentiometer (Leeds & Northrup Corp., 0-50 millivolt) through a micromicroammeter (Beckman Instruments, Inc., Model V) having a response time of several hundred seconds was capable of detecting a change of 0.02 mr./h. in radiation intensity. Variations of more than 0.08 mr./h. were compensated for by adjusting the pressure level in the vessel (lower pressure to counteract decrease in viscosity), and the resulting polymer had a commercially acceptable uniformity for extrusion into filaments. In the absence of the control exercised in this manner, such variation was manifested as undesirable change in viscosity of the product, which, however, was apparent only after a lapse of more than 3 hours at the slow throughput of this highly viscous polymer.

Although the invention is particularly advantageous for use in measuring viscosity changes in a continuous reaction vessel, as exemplified above, it may also be used to follow viscosity changes in a charge of liquid being agitated predominantly unidirectionally in a closed vessel. If the volume of the charge of liquid changes, as from chemical reaction, suitable compensating measures can be taken, as suggested above; however, the invention is applied most simply when any change in volume of the liquid is relatively small as compared with the change in viscosity. An example of such a reaction is the polymerization of polyethylene terephthalate during the later stages of the polymerization, at which time the removal of a relatively small amount of glycol results in a large increase in the viscosity of the polymer. The invention is similarly useful in the batch preparation of other condensation polymers, such as polyhexamethylene adipamide. The viscosity of certain vinyl polymerization mixtures in which the rate of reaction is relatively low and the product is a liquid can be determined advantageously by the method of the present invention. The method is also applicable to concentration of viscous solutions by evaporation, as well as to many other liquid systems.

Various other applications of the invention will be apparent to those skilled in the art. For example, although the invention has been described primarily in terms of measuring changes in viscosity, the method may be used to determine absolute viscosity through appropriate calibration of the equipment with liquids of known viscosity. As also will be apparent, appropriate servomechanism means may be adapted by connection to detector or recorder to respond directly to changes in the radiation level for automatic control of conditions affecting the observed viscosity. The illustrated arrangement of cylindrical vessel and agitation means of circular transverse cross-section having coincident axes is particularly convenient, as the peripheral extremities of the agitator maintain a constant clearance with respect to the inside wall of the vessel; however, should uniform clearance be unnecessary or undesirable, the transverse outline of the vessel may be varied or the two axes may be separated, although it usually will be desirable to keep them substantially parallel.

The claimed invention:

1. Process comprising agitating a partially confined liquid which undergoes viscosity changes about an axis within a stationary cylindrical vessel to produce relative vertical displacement of portions of the surface of the liquid at opposite sides of the axis, beaming radiant energy through at least part of the liquid in a displaced surface portion, and measuring the energy transmitted through the liquid after at least partial interception of the beam by the liquid.

2. Process comprising continuously passing viscous material into one end of a generally cylindrical vessel having its axis oriented non-vertically, displacing the material both along and about a substantially parallel axis to unlevel steady-state distribution characterized by elevation of the material to a maximum height at one side of the axis and depression to a minimum height at the opposite side, beaming radiant energy through at least part of the liquid in a displaced surface portion and measuring the absorption of radiation directed transversely through the liquid to intercept the surface at one of the height extremes to determine the amount of material displaced about the axis, and withdrawing from the opposite end at the same time a volume of material proportional to that entering the vessel to maintain a constant less-than-capacity content of material in the vessel.

3. Process comprising continuously passing polymerizable material at a constant rate into one end, through, and out the other end of a cylindrical vessel having a substantially horizontal axis, agitating the material predominantly in one direction about the axis and otherwise exposing the material to conditions conducive to polymerization inside the vessel, whereby the viscosity of the material increases during its passage through the vessel, beaming radiant energy through at least part of the surface of the polymerizable material and measuring the energy transmitted after at least partial interception of the beam by the material to provide a measurement of the viscosity of the material and counteracting any indicated deviation in viscosity from a constant value by imposing a contrary change in the polymerization conditions.

4. Apparatus comprising a generally cylindrical stationary vessel oriented with its axis in a direction other than vertical, rotatable means within the vessel for displacing contents of the vessel about a substantially parallel axis, a means of passing radiation through the vessel with diminished intensity as it passes through the displaced portion of the contents of said vessel, and a detector for the transmitted radiation located on a line from the source transverse to the axis and intercepting part of the contents of the vessel whereby the amount of displaced contents is detected.

5. Apparatus comprising a cylindrical vessel with intake and outlet at opposite ends oriented with its axis nonvertical, means located inside the vessel for agitating contents of the vessel, the vessel and the agitation means being mounted for rotation relative to one another about the axis and being adapted to displace the contents both along and about the axis, a source of radiation capable of passing with diminished intensity through the vessel and its contents, and a detector of gamma radiation located along a fixed line transverse to the axis and intercepting part of the interior of the vessel.

6. Apparatus comprising a cylindrical vessel oriented with its axis substantially horizontal, means for introducing polymerizable material into one end of the vessel and means for withdrawing polymerized material at the opposite end of the vessel at constant rate, agitating means located inside the vessel and rotatable to provide a net displacement of the material in one direction about the axis, radiation-transmitting and -receiving means adapted to detect the average mass of material displaced about the axis at a location between the ends of the vessel as the transmitted radiation is intercepted in part by the displaced material, and means for applying to polymerizable material in the vessel an agent conducive to polymerization of the material.

7. The apparatus of claim 6 wherein the radiation-transmitting means is located at the axis of the agitating means.

8. The process of claim 3 wherein the polymerizable material comprises a condensation polymer.

References Cited in the file of this patent

UNITED STATES PATENTS

| | | |
|---|---|---|
| 2,233,561 | Kalle | Mar. 4, 1941 |
| 2,301,204 | Fields et al. | Nov. 10, 1942 |
| 2,372,595 | Maxon | Mar. 27, 1945 |
| 2,626,786 | McGlothlin | Jan. 27, 1953 |
| 2,641,034 | Harter | June 9, 1953 |
| 2,671,174 | Burgholz | Mar. 2, 1954 |
| 2,674,104 | Street | Apr. 6, 1954 |
| 2,737,592 | Ohmart | Mar. 6, 1956 |
| 2,953,682 | Frank et al. | Sept. 20, 1960 |